United States Patent [19]

Hemmerich et al.

[11] 4,073,764

[45] Feb. 14, 1978

[54] DEGRADABLE PLASTIC COMPOSITION

[75] Inventors: Heinz-Peter Hemmerich; Gerhard Winter; Hans Jurgen Rosenkranz; Peter Woditsch, all of Krefeld, Germany

[73] Assignee: Bayer Aktiengesellschaft, Leverkusen, Germany

[21] Appl. No.: 597,269

[22] Filed: July 18, 1975

[30] Foreign Application Priority Data

July 27, 1974 Germany .............................. 2436260

[51] Int. Cl.$^2$ ................................................. C08J 3/20
[52] U.S. Cl. ............................... 260/37 N; 260/40 R; 260/42.43; 260/42.46; 260/42.47; 260/42.49; 260/DIG. 43; 526/4
[58] Field of Search .......... 260/37 N, 40 R, DIG. 43, 260/42.46, 42.47, 42.49, 42.43

[56] References Cited

U.S. PATENT DOCUMENTS

| | | | |
|---|---|---|---|
| 3,561,968 | 2/1971 | Dantro | 260/DIG. 43 |
| 3,709,984 | 1/1973 | Dantro | 260/DIG. 43 |
| 3,847,852 | 11/1974 | White et al. | 260/DIG. 43 |

OTHER PUBLICATIONS

"Encyclopedia of Chemical Technology" by Kirk-Othmer, vol. 20, pp. 397-398, Apr. 1970.
"Polymer Preprints", vol. 13, No. 2, 7/15/1972, p. 627, Scott.
"Plastics Technology", vol. 9, No. 11, pp. 45-48, Martinovich.

Primary Examiner—Eugene C. Rzucidlo
Attorney, Agent, or Firm—Burgess, Dinklage & Sprung

[57] ABSTRACT

A plastic composition degradable under the influence of weather or light, comprising a plastic material and finely divided titanium dioxide with a specific surface of more than about 20 m$^2$/g. Preferably the titanium dioxide is obtained by hydrolyzing titanium sulfate in aqueous solution, has a predominantly anatase structure, a lightening power of less than about 400, a specific surface of about 60 to 400 m$^2$/g and is present in about 0.5 to 5% by weight of the composition, and the plastic material is selected from the group consisting of polyethylene, ethylene-vinyl acetate copolymer, polystyrene, polyvinyl chloride, polyamides and ABS-polymers.

8 Claims, No Drawings

DEGRADABLE PLASTIC COMPOSITION

It is desirable to have short-lived, degradable plastics for certain applications, for example for packaging materials, drinking cups, etc., which are not always properly dumped or incinerated in the required manner.

It is known that photodegradable plastics can be produced by adding additives which accelerate degradation such as, for example, metal compounds of the Fe-N, N-dialkyl dithiocarbamate type, as described in German Offenlegungsschrift No. 2,136,704, or carbonyl compounds such as benzophenones, arylalkyl ketones, anthraquinones, etc. (German Offenlegungsschrift No. 2,133,896).

These additives are dissolved in the polymers and may be extracted by virtue of their low molecular weights. Some or all of the photodegradability can be lost as a result of extraction of the additives. In addition, problems can arise in cases where plastics containing additives which promote photodegradation are used for the packaging of foodstuffs. Additives which migrate into the foods can affect their flavor and aroma. Toxicological problems necessitate particularly intensive testing and can restrict or preclude the use of additives of this kind for plastics intended for use in the food sector.

Another method of producing photodegradable plastics is described, for example, in German Offenlegungsschrift No. 2,206,806 and results in an incorporation of photosensitive groups in the corresponding polymer. If it is desired to produce photodegradability by incorporating reactive groups in the polymer, the polymer has to be modified during the actual production of the plastic material by polymerizing into it special comonomers containing photosensitive groups. This complicates production of the degradable plastic material. In addition, this method cannot be generally applied since it is necessary to determine from one case to another whether the required monomers can, in fact, be copolymerized at all.

German Offenlegungsschrift No. 2,250,885 relates to plastic products degradable in the open, consisting of a hydrocarbon resin and so-called promoters, generally inorganic particles with a large specific surface, such as silica for example. At least 65% of the hydrocarbon resins consist of the polymerized monomeric units of propylene, butene, pentene or hexene, and are homopolymers of one of these monomers, interpolymers of two or more of these monomers or interpolymers of one or more of these monomers with up to 35% of ethylene. One disadvantage of these known degradable plastic products is that they are limited to a particular hydrocarbon resin system.

The object of the present invention is to provide by a simple process plastic compositions which will degrade under the effect of weather and/or light without any need for the presence of a special resin system.

Accordingly, the present invention relates to plastic compositions, optionally containing standard additives, which will degrade under the effect of weather and/or light and which contain a plastic material and finely divided titanium dioxide with a specific surface of more than about 20 $m^2/g$.

The invention also relates to a process for producing plastic compositions, optionally containing standard additives, which will degrade under the effect of weather and/or light, distinguished by the fact that finely divided titanium dioxide with a specific surface of more than about 20 $m^2/g$ is worked into plastics at temperatures in the range of about 100° C to 350° C over a mixing period ranging from about 1 minute to 30 minutes.

Suitable plastic materials include any of the usual plastics obtained by polymerization, polycondensation or polyaddition, thermoplasts being preferred. Reference is made to the homopolymers and/or copolymers of olefins, dienes and vinyl monomers such as, for example, ethylene, propylene, 1-butene, 4-methyl-1-pentene, 1,3-butadiene, isoprene, 2-chloro-1,3-butadiene, styrene, α-methyl styrene, (meth)acrylic acid, (meth) acrylates such as methyl, ethyl and butyl (meth) acrylate, (meth) acrylamide, (meth) acrylonitrile, vinylacetate, vinyl propionate, methyl and ethyl vinyl ether, methyl vinyl ketone, methyl isopropenyl ketone, vinyl chlodride, vinylidene chloride, maleic acid anhydride, maleic acid and fumaric acid. Reference is also made to polyamides such as nylon-66 and nylon-6, polyesters, polyurethanes and ABS-polymers. It is preferred to use polyethylene, ethylene-vinyl acetate copolymers, polystyrene, polyvinyl chloride, polyamides or ABS-polymers. Polyethylene and ethylenevinyl acetate copolymers are particularly preferred.

Very small $TiO_2$ particles (hereinafter referred to as degradation types) with a correspondingly large specific surface are suitable for the rapid degradation of plastics. The crystallite sizes as determined by X-ray photography show an average particle size of about 50 to 1500 A with a specific surface of more than about 20 $m^2/g$ and preferably more than about 40 $m^2/g$. $TiO_2$ with a specific surface of about 60 $m^2/g$ to 400 $m^2/g$ is particularly suitable.

The degradation types suitable for the degradation of plastics may be further characterized on the basis of X-ray diffractograms which show the anatase phase predominates, although a few, widely scattered X-ray reflexes occur in some cases. This low crystallinity is desirable, although not absolutely essential, for an intensified degrading effect in organic plastic compositions.

Degradation types of the kind in question may be produced by known methods. The most common and simple method is the hydrolysis of chlorides, sulfates or esters of titanium, and the reaction of alkali metal titanates with acids. Particle size can be specifically adjusted in dependence upon the temperature at which the hydrolyzate is dried or tempered. The process described above gives finely divided $TiO_2$ particles which, after drying or tempering at temperatures below 800° C, are suitable for degrading plastics under the effect of weather and/or light.

The degradation particles can also be defined with respect to $TiO_2$ pigments through their lightening power. $TiO_2$ pigments are optimized by suitably selecting production conditions in such a way that they have maximum lightening power according to DIN 53 192 of more than 600 and preferably more than 750. By contrast, degradation types have a lightening power (LP) of less than about 500 and preferably less than about 400. The lightening power of the degradation particles diminishes or remains intact with increasing dispersion. This behavior is not consistent with experience that has been gained in the field of $TiO_2$ pigments, because the lightening power of pigments increases with increasing dispersion.

The purity of the $TiO_2$-particles used is not critical and fluctuates over a wide range, depending upon the particular process used for their production. Thus, the TiO₂ particles may contain considerable proportions of water, sulfate or chloride ions. It is immaterial to the application in plastics in accordance with the invention whether the water is present in adsorbed or chemically bound form, providing no water is released during incorporation of the $TiO_2$ particle which would adversely affect production of the plastics compositions according to the invention. Accordingly, the $TiO_2$ particles are freed from non-bound or readily eliminated water at temperatures above 100° C, and at the same time also lose some of the free acid which they may possibly still contain from their production. These drying and water-removing temperatures, which should be above the processing temperature applied during production of the degradable plastic material, also influence the particle size of the $TiO_2$ particles. Specific surface decreases with increasing temperature and drying time. $TiO_2$ hydrolyzates formed during the hydrolysis of titanium sulfate from which water was removed at 200° C subsequently showed crystallite sizes of 155 A and a specific surface according to BET of 113 m²/g. After 2 hours at 600° C, the specific surface falls to 39 m²/g and, at the same time, there is an increase in the size of the crystallites to 350 A. Both products consist of more than 85% of $TiO_2$ and are suitable for the production of degradable plastic compositions. Like the quantity of water present in the $TiO_2$, the content of chloride and sulfate ions is not a critical factor either. Thus, the degradation types according to the invention is finely divided form with large specific surfaces and a sulfate content corresponding to up to about 3% by weight of sulfur and a chloride content up to about 5% by weight, are eminently suitable for incorporation into plastics in accordance with the invention. This minimal influence of impurities simplifies production of the finely divided $TiO_2$ particles and makes all known processes for producing $TiO_2$ hydrolyzates suitable.

The degradation types are added to the thermoplastic plastics in such quantities that the resulting plastic compositions are able to undergo accelerated degradation and show the usual processing and service properties. The content of degradation types in the plastic compositions according to the invention amounts to between about 0.1 and 60% by weight, preferably to between about 0.3 and 30% by weight and, with particular preference, to between about 0.5 and 5% by weight. Mixtures of various degradation types may also be used in order to obtain particular degradation properties. Since the degradation types are virtually devoid of pigment properties, especially lightening power, and since the plastic compositions according to the invention therefore give more transparent shaped articles, e.g. films, moldings, etc., with a lower degree of whiteness than plastic compositions produced with conventional white pigments, it may be advisable to use combinations of one or more degradation types with conventional white or colored pigments. In this case, the plastic compositions obtained are both degradable and have the usual color and whiteness coupled with the usual concealed coloring. The white or colored pigments may be used in quantities of about 0.5 to 40% by weight, based on the plastic composition.

Mixtures consisting of the degradation types and the usual thermoplastic plastics may also be prepared by the master batch method. In this method, a master batch containing about 5 to 75% by weight and preferably about 20 to 50% by weight of degradation types is initially prepared. In order to obtain the end product, the master batch is diluted, for example by extrusion, with the thermoplastic plastic which has already been used for producing the master batch and which is uniformly compatible with it, in the quantity required for the desired degradation type content.

Incorporation of the degradation types into the particular thermoplastic material for producing a master batch containing degradation types or a plastic composition according to the invention containing degradation types, may be carried out by mixing, for example extrusion, kneading or rolling, in the machines normally used for this purpose under the conditions normally applied for the particular type of thermoplastic plastic material used. Thus, mixing is carried out over a period ranging from about 1 minute to 30 minutes at temperatures in the range from about 100° to 350° C Double-screw extruders have proved to be particularly suitable for incorporating the degradation types.

Other substances which promote photodegradation, for example metal complexes (German DOS 2,136,704) are aromatic carbonyl compounds (German DOS 2,133,896), may optionally be added to the plastic compositions according to the invention.

In addition, conventional additives such as blowing agents, pigments or fillers, antistatics, lubricants or other auxiliaries, may be added to the plastic compositions according to the invention. Like all thermoplastics, they may be processed by known methods into molding, films, filaments or fibers, using the usual machines.

The invention is illustrated by the following Examples.

EXAMPLE 1

A 20% $TiO_2$ master batch was obtained from a $TiO_2$ with a specific surface of 84 m²/g and a high-pressure polyethylene (ethylene-vinylacetate copolymer, melt index 1.4 – 1.8 g/10 mins., equivalent density 0.922 g/cc) by extrusion twice in a double-screw extruder at a temperature of 180° C. An approximately 50 μ thick film with a $TiO_2$ degradation type content of 1.5% was then blown in a film-blowing machine.

The film was subjected to artificial weathering in the Xenon test (light-dark cycle 1 : 1, i.e. 100 Weather-O-Meter hours ≙ 50 hours exposure to light). At the same time, a film of this polyethylene without the $TiO_2$ degradation type added to it was subjected to the same test in a comparison experiment.

The degradation of the films was assessed by measuring their elongation at break and their tensile strength in the longitudinal direction. The results are shown in Table 1.

Table 1

| Test | TiO₂-degradation types specific surface m²/g | TiO₂-degradation types proportion in the film % | Weather-O-Meter hours | Elongation at break % | Tensile strength T Mega-Pascal |
|---|---|---|---|---|---|
| 1 | — | 0.0 | 0 | 250 | — |
|   |   |   | 100 | 260 | — |
|   |   |   | 400 | 260 | — |
|   |   |   | 1000 | 250 | — |
| 2 | 84 | 1.5 | 0 | 240 | 21.1 |
|   |   |   | 50 | 210 | 19.0 |
|   |   |   | 100 | 130 | 13.2 |
|   |   |   | 200 | 60 | 9.5 |
|   |   |   | 400 | cannot be measured | cannot be measured |

EXAMPLE 2

Products with $TiO_2$ degradation type contents of 1.5% were obtained from various $TiO_2$ degradation types with different specific surfaces, which in some cases had also been organically after-treated, and the high-pressure polyethylene of Example 1 by extrusion twice in a double-screw extruder at a temperature of 180° C. Approximately 300 μ thick films were then produced from those products.

The films were subjected to artificial weathering in the Xenon test (Atlas Weather-O-Meter, 600 W lamp, spraying cycle 102 : 18). At the same time, a film of this polyethylene without any $TiO_2$ degradation type added to it was subjected to the same test in a comparison experiment.

The degradation of the films was assessed by measuring elongation at break and tensile strength. The results are shown in Table 2.

Table 2

| Test | $TiO_2$-degradation types specific surface $m^2/g$ | proportion om the film % | Weather-O-Meter hours | Elongation at break % | Tensile strength T Mega-Pascal |
|---|---|---|---|---|---|
| 1 | — | 0.0 | 0 | 821 | 15.5 |
|   |   |   | 100 | 830 | 13.9 |
|   |   |   | 190 | — | — |
|   |   |   | 350 | 754 | 15.2 |
|   |   |   | 511 | 724 | 13.7 |
|   |   |   | 700 | 533 | 11.6 |
|   |   |   | 1000 | 358 | 10.8 |
| 2 | 113 | 1.5 | 0 | 681 | 13.0 |
|   |   |   | 100 | 494 | 12.1 |
|   |   |   | 190 | — | 10.1 |
|   |   |   | 350 | 137 | 8.6 |
|   |   |   | 511 | 73 | 8.2 |
|   |   |   | 700 | 64 | 7.9 |
| 3 | 84 | 1.5 | 0 | 586 | 12.2 |
|   |   |   | 100 | 571 | — |
|   |   |   | 190 | 342 | 10.3 |
|   |   |   | 350 | 101 | 9.1 |
|   |   |   | 511 | 80 | 8.3 |
|   |   |   | 700 | 59 | 8.1 |
| 4 | 40 | 1.5 | 0 | 619 | 13.5 |
|   |   |   | 100 | 544 | 13.1 |
|   |   |   | 190 | — | 12.3 |
|   |   |   | 350 | 233 | 9.2 |
|   |   |   | 511 | 71 | 8.4 |
|   |   |   | 700 | 52 | 8.4 |
| 5 | 108 | 1.5 | 0 | 738 | 13.0 |
|   |   |   | 100 | 662 | — |
|   |   |   | 190 | 413 | 10.0 |
|   |   |   | 350 | 242 | 8.8 |
|   |   |   | 511 | 73 | 8.0 |
|   |   |   | 700 | 67 | 7.8 |
| 6 | 108 | 1.5 | 0 | 700 | 13.1 |
|   |   |   | 100 | 609 | 13.5 |
|   |   |   | 190 | — | — |
|   |   |   | 350 | 190 | 19.1 |
|   |   |   | 511 | 88 | 8.4 |
|   |   |   | 700 | 73 | 8.3 |
| 7 | 114 | 1.5 | 0 | 622 | 13.0 |
|   |   |   | 100 | — | 12.7 |
|   |   |   | 190 | 511 | 12.5 |
|   |   |   | 350 | 155 | 9.0 |
|   |   |   | 511 | 99 | 8.3 |
|   |   |   | 700 | 60 | 8.0 |
| 8 | 115 | 1.5 | 0 | 714 | 13.2 |
|   |   |   | 100 | — | — |
|   |   |   | 190 | 477 | 11.9 |
|   |   |   | 350 | 151 | 8.7 |
|   |   |   | 511 | 88 | 8.2 |
|   |   |   | 700 | 72 | 8.1 |
| 9 | 115 | 1.5 | 0 | 751 | 13.7 |
|   |   |   | 100 | 662 | 14.0 |
|   |   |   | 190 | 632 | — |
|   |   |   | 350 | 118 | 8.9 |
|   |   |   | 511 | 50 | 7.6 |
|   |   |   | 700 | 64 | 18.1 |
| 10 | 160 | 1.5 | 0 | 655 | 13.3 |
|   |   |   | 100 | 546 | 11.7 |
|   |   |   | 190 | 482 | 11.6 |
|   |   |   | 350 | 100 | 8.7 |
|   |   |   | 511 | 49 | 8.2 |
|   |   |   | 700 | 34 | 8.2 |

Table 2-continued

| Test | $TiO_2$-degradation types specific surface $m^2/g$ | proportion om the film % | Weather-O-Meter hours | Elongation at break % | Tensile strength T Mega-Pascal |
|---|---|---|---|---|---|
|   |   |   | 700 | 34 | 8.2 |

EXAMPLE 3

A $TiO_2$-sludge of anatase structure obtained by hydrolyzing titanium sulfate solution was neutralized with sodium hydroxide, washed out and dried at a temperature of 300° C. The plastic-degrading particles obtained in accordance with the invention have a crystallite size of about 190 A (determined X-ray photographically from the (101)-reflex) and a specific surface according to BET of 84 $m^2/g$. At 195, the lightening power of the particles according to DIN 53 192 was considerably below the value of 600 characteristic of anatase pigments. The ignition residue after 2 hours at 900° C amounted to 95.4%.

Two films, approximately 35 μm thick and approximately 200 μm thick, were blown in accordance with Example 1 using these finely divided $TiO_2$ particles and polyethylene. The $TiO_2$ content amounted to 1.5% by weight. A 290 μm thick pigment-free film was produced for comparison and subjected to artificial weathering together with the other two blown films. To this end, pieces were cut from each film and, after their surface had been determined, were weathered in an Atlas arc Weather-O-Meter with Correx D-filters. The spraying cycle was 17 : 3, i.e. dry periods lasting 17 minutes alternated with spraying periods lasting 3 minutes.

Degradation of the polyethylene films was followed gravimetrically and is shown in Table 2 as a function of the weathering time.

The results of measurement were converted to a surface area of 100 $cm^2$ in order to obtain comparable values.

Table 3

| Gravimetrically determined degradation of polyethylene films | | | |
|---|---|---|---|
| Weather-O-Meter hours | Weight loss (mg) per 100 $cm^2$ of film surface | | |
|   | unpigmented 290 μm thick | 1.5 % by weight of $TiO_2$ | |
|   |   | 35 μm thick | 200 μm thick |
| 20 | 0.00 | 12.38 | 18.29 |
| 40 | −0.80 | 21.80 | 35.84 |
| 80 | −0.96 | 39.79 | 70.66 |
| 120 | −0.96 | 56.83 | 107.54 |
| 160 | −0.96 | 73.12 | 143.91 |
| 200 | −0.71 | 90.79 | 183.68 |

It can be seen that this test is a good measure of the degradation of the plastic material under the influence of weather. The greater degradation of the 200 μm thick film is probably attributable to the greater absorption of the thicker film. By contrast, the unpigmented film not only undergoes no loss of weight throughout the entire weathering period, but also becomes heavier, probably due to swelling and surface absorption or incorporation.

EXAMPLE 4

$TiO_2$ hydrolyzate in the form of a 20% suspension was neutralized with sodium hydroxide and washed free from salt. Subsequent drying or tempering at different temperatures and over periods of various length produced a number of finely divided $TiO_2$ degradation particles of anatase structure which are shown in Table 4. The specific surfaces decreased with increasing treatment temperature.

Table 4

Degradation particles of different specific surface

| Example | Dry conditions time (h) | temp. (° C) | specific surface $m^2/g$ | crystallite size (A) |
|---|---|---|---|---|
| 4 a | 44 | 200 | 113 | 155 |
| 4 b | 21 | 300 | 84 | 190 |
| 4 c | 4 | 400 | 61 | 245 |
| 4 d | 4 | 500 | 40 | 325 |
| 4 e | 2 | 600 | 39 | 350 |
| 4 f | 2 | 700 | 26 | 590 |
| 4 g | 2 | 800 | 11.4 | 1250 |

These finely divided degradation types were used for the degradation of polyvinyl chloride. The PVC-films were produced by dissolving Vinylite, a mixture of 91% of PVC, 3% of polyvinyl acetate and 6% of polyvinyl alcohol, in butyl acetate. The finely divided $TiO_2$ was dispersed into this solution in a planetary mill, and an approximately 50 μm thick film was produced in a lacquer centrifuge. After drying at room temperature, a suitable piece of film measuring 4.2 × 12.5 cm was cut out and subjected to weathering in a Weather-O-Meter in accordance with Example 3.

The reduction in weight of the PVC-films filled with 15% by weight of $TiO_2$ as a function of the weathering time is set out in Table 5. The weight loss, based on 100 $cm^2$ of film surface, shows that finely divided $TiO_2$ hydrolyzates of this kind are able to degrade PVC. $TiO_2$ particles with a specific surface of less than 20 $m^2/g$ are far less active and are no longer suitable for rapid degradation of the plastic material.

Table 5

Gravimetrically determined degradation of PVC films

| Weather-O-Meter hours | Pigments according to Table 4 | | | | | | |
|---|---|---|---|---|---|---|---|
| | 4a | 4b | 4c | 4d | 4e | 4f | 4g |
| 20 | 8.4 | 9.7 | 13.7 | 18.1 | 20.0 | 17.3 | 8.7 |
| 40 | 20.2 | 24.4 | 32.0 | 39.0 | 42.1 | 37.8 | 19.4 |
| 60 | 39.2 | 42.8 | 49.0 | 62.7 | 65.6 | 60.6 | 32.2 |
| 80 | 54.1 | 59.0 | 74.1 | 85.0 | 86.1 | 81.6 | 45.0 |
| 100 | 70.5 | 78.3 | 92.6 | 106.0 | 109.8 | 101.6 | 55.8 |

EXAMPLE 5

A $TiCl_4$ hydrolyzate was washed and carefully dried for 12 hours at 130° C. The specific surface amounted to 152 $m^2/g$ and the ignition residue after 2 hours at 900° C was 87.0% by weight. Incorporation into alkyd resin lacquer films was carried out in accordance with Example 4 by grinding a binder, degradation type and solvent in a planetary mill, followed by film formation in a lacquer centrifuge. The alkyd resin layers were filled with 15% by weight of $TiO_2$. Testing was carried out gravimetrically in accordance with Examples 3 and 4. The results are set out in Table 6. The tests in alkyd resin films were preferred because greater differentiation between the test specimens was possible.

EXAMPLE 6

$TiO_2$ hydrolyzate sludge from the hydrolysis of titanium sulfate solutions was carefully dried at 130° C to give a particularly finely divided degradation type with a specific surface of 245 $m^2/g$. The ignition residue after 2 hours at 900° C amounted to only 86.9% by weight and was indicative of a considerable content of $SO_4^{2-}$ ions and the presence of water attached to or incorporated in the surface. The S-content was found by analysis to amount to 2.6% by weight. The results of weathering tests on the alkyd resin are set out in Table 6 under the heading Example 6 a. Before drying, the same $TiO_2$-sludge was neutralized, washed free from salts and dried at 250° C. Thereafter the specific surface amounted to 114 $m^2/g$ while at 96.1% the ignition residue was extremely high for the degradation types according to the invention, above all when the low drying temperature was taken into consideration. The analytically determined S-content amounted to only 0.5% by weight.

Incorporation into alkyd resin lacquer film and testing after weathering in accordance with Examples 3 and 4 produced the results set out in Table 6 under the heading 6b.

Table 6

Gravimetric degradation of alkyd resin films in mg, based on 100 $cm^2$ of film surface

| Weather-O-Meter hours | Example 5 | 6a | 6b | 7 |
|---|---|---|---|---|
| 20 | 7.75 | 16.75 | 27.69 | 18.52 |
| 40 | 11.24 | 38.22 | 60.77 | 39.82 |
| 60 | 15.50 | — | 92.84 | 65.62 |
| 80 | 23.02 | 98.52 | 131.24 | 92.37 |
| 120 | 38.87 | 146.45 | 188.99 | 138.17 |

EXAMPLE 7

A $TiO_2$-hydrolyzate from a Ti-sulfate solution was bleached, washed and spray-dried. Incorporation in accordance with Example 3 or 4 after stream-jet grinding produces the gravimetrically determined degradation of the alkyd resin films shown in Table 6.

EXAMPLE 8

A $TiCl_4$ hydrolyzate produced in accordance with Example 5 and a $TiO_2$-hydrolyzate from Ti-sulfate solution corresponding to Example 4e were tested in polyethylene together with a commercially available $TiO_2$-flame hydrolyzate with a specific surface of 50 $m^2/g$, identified hereinbelow as P 25.

To this end, quantities of 1.5% by weight of $TiO_2$ were worked into the polyethylene in a double-screw extruder, and approximately 420 μm thick films were subsequently produced from the polyethylene. Weathering was carried out in a Weather-O-Meter in accordance with Example 3. Degradation of the polyethylene films was determined gravimetrically as a function of the weathering time, and is shown in Table 7.

Table 7

Gravimetric degradation of polyethylene films in mg, based on 100 $cm^2$ of film surface (pigmenting) level 1.5 % by weight)

| Weather-O-Meter hours | unpigmented | P25 | $TiO_2$ Example 5 | $TiO_2$ Example 4e |
|---|---|---|---|---|
| 20 | 1.6 | 4.7 | 6.4 | 10.3 |
| 40 | 1.1 | 9.1 | 16.0 | 20.8 |
| 68 | 1.1 | 9.7 | 19.1 | 28.9 |
| 100 | 1.3 | 16.9 | 29.5 | 50.0 |
| 160 | 0.9 | 20.7 | 39.7 | 71.1 |
| 180 | 0.1 | 24.7 | 48.8 | 90.0 |
| 220 | 0.4 | 28.0 | 57.5 | 106.8 |
| 240 | 1.2 | 29.3 | 60.9 | 115.7 |
| 300 | 2.4 | 30.9 | 72.4 | 140.4 |
| 340 | 3.1 | 32.1 | 79.1 | 154.7 |

It will be appreciated that the instant specification and examples are set forth by way of illustration and not limitation, and that various modifications and changes may be made without departing from the spirit and scope of the present invention.

What is claimed is:

1. A plastic composition degradable under the influence of weather or light, cimprising a plastic material and about 0.1 to 60% by weight of the composition of finely divided titanium dioxide with a specific surface of more than about 20 m$^2$/g, the titanium dioxide having been obtained by hydrolyzing a titanium compound in aqueous solution.

2. A degradable plastic composition as claimed in claim 1, wherein the titanium dioxide has a predominately anatase structure.

3. A degradable plastic composition as claimed in claim 1, wherein the titanium dioxide has a lightening power of less than about 500.

4. A degradable plastic composition as claimed in claim 1, wherein the plastic material is selected from the group consisting of homopolymers and copolymers of olefins, dienes and vinyl monomers, polyesters, polyamides, polyurethanes and ABS-polymers.

5. A degradable plastic composition as claimed in claim 4, wherein the titanium dioxide is obtained by hydrolyzing titanium sulfate in aqueous solution, has a predominantly anatase structure, a lightening power of less than about 400, a specific surface of more than about 40 m$^2$/g and is present in about 0.3 to 30% by weight of the composition.

6. A degradable plastic composition as claimed in claim 5, wherein the titanium dioxide has a specific surface of about 60 to 400 m$^2$/g and is present in about 0.5 to 5% by weight of the composition, and the plastic material is selected from the group consisting of polyethylene, ethylene-vinyl acetate copolymer, polystyrene, polyvinyl chloride, polyamides and ABS-polymers.

7. A degradable plastic composition as claimed in claim 1, in the form of a shaped article.

8. A degradable plastic composition as claimed in claim 6, in the form of a film or molded article.